UNITED STATES PATENT OFFICE.

HEINRICH THRON, OF FRANKFORT-ON-THE-MAIN, GERMANY, ASSIGNOR TO THE FIRM OF VEREINIGTE CHININFABRIKEN ZIMMER & CO., GESELLSCHAFT MIT BESCHRÄNKTER HAFTUNG, OF FRANKFORT-ON-THE-MAIN, GERMANY.

MANUFACTURE OF ESTERS OF THE HYDROCINCHONA ALKALOIDS.

1,041,528.   Specification of Letters Patent.   Patented Oct. 15, 1912.

No Drawing.   Application filed December 23, 1911. Serial No. 667,447.

*To all whom it may concern:*

Be it known that I, HEINRICH THRON, a subject of the German Emperor, and resident of Frankfort-on-the-Main, Germany, have invented certain new and useful Improvements in the Manufacture of Esters of the Hydrocinchona Alkaloids, of which the following is a specification.

Of the esters of the hydro-cinchona-alkaloids, only the acetyl-hydroquinin and the acetyl-hydrocinchonidin are known in the amorphous state. I have now succeeded in producing esters of hydro-cinchona-alkaloids such as hydro-quinin, hydrocinchonin, hydrocinchonidin, hydrocuprein or hydro-apoquinin, and the like, by means of organic acids, which esters are easily crystallizing and constitute tasteless bodies which are valuable medicaments.

According to this invention I cause, for instance, the chlorids, or the anhydrids, or the phenol esters, of the organic acids, of which it is desired to obtain the corresponding hydrocinchona-alkaloid esters, to react on the corresponding hydrocinchona-alkaloids, their salts, or their oxy-magnesium haloid compounds, or I may start from the cinchona alkaloid esters and treat these with hydrogen in the presence of metals of the platinum group, or of colloidal solutions of these metals.

The hydrocinchona-alkaloid esters prepared according to this invention differ chemically from the known cinchona alkaloid esters in being much more stable toward potassium permanganate. In therapeutics they have, over the last named esters, the advantage that they contain, as active compounds, hydrocinchona-alkaloids which have specific medical action. Compared with the free hydrocinchona-alkaloids and salts thereof they have the advantage that they have no bitter taste.

The following examples illustrate the manner in which this invention can be performed, but it is not limited to these examples. The parts are by weight.

*Example I: Hydroquinin-ethyl-carbonate.*—326 parts of hydroquinin (one molecular proportion) are dissolved in 1600 parts of benzene, mixed with 108.5 parts of ethyl ester of chloroformic acid (one molecular proportion), and boiled for ten minutes. The resulting ester is then extracted with dilute hydrochloric acid, separated from the solution by means of ammonia and extracted with ether and then the greater part of the ether is distilled off and the residue is mixed with petroleum-benzin. On cooling, the hydroquinin ethyl-carbonate separates in fine colorless needles which melt at from 75° to 78° centigrade and are almost tasteless. They dissolve readily in alcohol or chloroform, but are difficultly soluble in petroleum-benzin and water.

*Example II: Benzoyl-hydroquinin.*—To the Grignard reaction product, obtained in the usual manner from 24.3 parts of magnesium 1000 parts of anhydrous ether and 64.5 parts of ethyl-chlorid 326 parts of hydroquinin are added and the mixture is set aside and frequently shaken until the evolution of ethane has ceased. Then 140.5 parts of benzoyl-chlorid are added slowly and after the mixture has been allowed to stand for several hours, dilute hydrochloric acid is added, until all has dissolved. The aqueous solution is then separated from the ether and the base is separated by means of ammonia and absorbed in ether. On being allowed to stand the resulting benzoyl-hydroquinin crystallizes in large colorless and tasteless crystals which melt at from 102° to 107° centigrade. They readily dissolve in alcohol and chloroform, but are difficultly soluble in petroleum-benzin and water. The salicylate of benzoyl-hydroquinin is precipitated in the form of white needles when the ethereal solution of the base is mixed with salicylic acid and the precipitate is purified by recrystallizing out of alcohol. It melts at from 190° to 193.5° centigrade and is perfectly tasteless.

*Example III: Salicyl-hydroquinin.*—326 parts of hydroquinin (one molecular proportion) are heated with 214 parts of salol (one molecular proportion) or preferably with a small excess thereof, for about 6 hours to from 130° to 140° centigrade. The melt is dissolved in 2000 parts of hot benzene, the resulting phenol is removed by shaking several times with dilute ammonia, the base is extracted with dilute hydrochloric acid from the benzene solution and the acid solution is washed with ether. By adding ammonia, the base is then separated from the acid liquor and is then absorbed in ether. On the ethereal solution being allowed to stand the salicyl hydroquinin separates out in large colorless and tasteless crystals which are purified by recrystallizing from dilute alcohol. The melting point of the product is from 115° to 119° centigrade. It is readily soluble in alcohol or chloroform, but is difficultly soluble in petroleum benzin and water.

*Example IV: Hydroquinin carbonate.*—To a solution of 326 parts of hydroquinin (one molecular proportion) in 3000 parts of chloroform, 100 parts of pyridin are added, then, while well cooling, a solution of 49.5 parts of phosgene (half a molecular proportion) in 500 parts of chloroform is introduced drop by drop. The reaction product is shaken with 3000 parts of ice and an excess of sulfuric acid and after the chloroform having been separated the acid solution is precipitated by means of ammonia. The ammoniacal liquor in which the pyridin is present, is drawn off by suction and the residue is dissolved in ether. The ethereal solution is, after drying with calcium chlorid, freed from the ether by distillation, the residue dissolved in 3000 parts of absolute alcohol and mixed with 50 per cent. sulfuric acid, until acid sulfate of hydroquinin carbonate no longer separates out. This salt consists of needle-shaped crystals which are readily soluble in water but scarcely soluble in alcohol. After drawing off by suction and washing out the salt with alcohol, the bisulfate is dissolved in ice water and shaken with ether and an excess of ammonia. By evaporating the dried ether solution and triturating the residue, the hydroquinin carbonate is obtained as a colorless and quite tasteless powder. This powder readily dissolves in alcohol and chloroform, but is difficultly soluble in petroleum-benzin and water. It forms a yellow herapathite and is stable against permanganate in acid solution.

*Example V: Paramino-benzoyl-hydroquinin.*—326 parts of hydroquinin (one molecular proportion) are dissolved in 3 kilograms of benzene, mixed with 185.5 parts of para nitro benzoyl chlorid (one molecular proportion) and heated for a short time at boiling point. When the mass has cooled, it is extracted by means of dilute hydrochloric acid and the acid solution is shaken with 4 kilograms of ether and ammonia in excess. Para-nitro-benzoyl-hydroquinin at once separates out from the ether in fine needles which are drawn off by suction and are recrystallized out of benzene. It forms light yellow colored tasteless needles which are almost insoluble in ether and petroleum-benzin, very difficultly soluble in cold benzene and alcohol, more readily in hot alcohol and melt at from 163° to 164° centigrade. In order to produce the para-amino-benzoyl-hydroquinin, 1 part of para-nitro-benzoyl hydroquinin, 4 parts of 20 per cent. sulfuric acid, 8 parts of water, 4 parts of a stannous chlorid solution (consisting of 600 parts of stannous chlorid and 400 parts of 25 per cent. hydrochloric acid) are heated for one hour to from 90° to 100° centigrade. After the mass has cooled it is poured into soda lye in excess, the precipitate is drawn off by suction and recrystallized out of a mixture of equal parts of benzene and petroleum benzin. The para-amino-benzoyl-hydroquinin is thus obtained in colorless and tasteless needles which melt at from 155° to 157.5° centigrade and are readily soluble in alcohol or chloroform but difficultly soluble in petroleum-benzin and water.

*Example VI: Hydroquinin-ethyl-carbonate.*—10 parts of quinin-ethyl-carbonate are dissolved in 14 parts of twenty per cent. sulfuric acid and eighty parts of water and mixed with a solution of 0.1 part of colloidal palladium in 10 parts of water. Then the mixture is shaken with hydrogen at a pressure of 3 meters of water, until no more hydrogen is absorbed. The liquor is then mixed with ammonia in excess and the base is extracted with ether. The residue remaining on distilling off the ether is dissolved in one hundred parts of hot petroleum-benzin. On cooling the solution the hydroquinin-ethyl-carbonate crystallizes in fine needles which possess the properties described under the foregoing Example I.

*Example VII: Para-amino-benzoyl-hydroquinin.*—100 parts of para-amino-benzoyl-quinin are dissolved in 400 parts of water and 30 parts of sulfuric acid; 1 part of palladium black is added and the mixture is shaken with hyrogen until the gas ceases to be absorbed. Then the palladium is separated by filtration, the base precipitated with ammonia and recrystallization effected in benzene-benzin. The body thus obtained has the properties described in Example V.

*Example VIII: Hydro-cinchonin-ethyl-carbonate.*—30 parts of cinchonin-ethyl-carbonate are dissolved in 160 parts of alcohol; the mixture is mixed with a solution of 0.1 part of colloidal palladium in 60 parts of water and shaken with hydrogen at a pressure of a few meters of water until the volume of the hydrogen no longer decreases. The greater part of the alcohol is then distilled off, and the residue is dissolved in dilute sulfuric acid so that the palladium is precipitated. The mass is filtered and the filtrate mixed with ammonia in excess and the base is absorbed in ether. After distilling off the ether the mass is dissolved in dilute alcohol out of which the hydrocinchonin-ethyl-carbonate crystallizes in fine, colorless and tasteless needles which melt at 134° centigrade. It is readily soluble in alcohol or chloroform, but is difficultly soluble in petroleum-benzin and water. In sulfuric acid solution it is, in contradistinction to cinchonin-ethyl-carbonate, stable toward potassium permanganate.

*Example IX: Benzoyl-hydrocuprein.*—312 parts of hydrocuprein are dissolved in about 3100 parts of chloroform; then 150 parts of pyridin and 140.5 parts of benzoyl chlorid are successively added and the mass is heated for a short time at the boiling point. After cooling the chloroform solution is extracted with very dilute sulfuric acid and the acid solution is precipitated with soda lye and subjected to suction, washed with water and the residue is absorbed in ether. After drying the ethereal solution with calcium chlorid, the benzoyl-hydrocuprein separates out in colorless crystals which are purified by recrystallization from benzene. The melting point is 172° centigrade. This product is readily soluble in alcohol or chloroform, but is difficultly soluble in petroleum benzin and water.

*Example X: Dibenzoyl-hydrocuprein.*—To a solution of 416 parts of benzoyl-hydrocuprein in about 2100 parts of benzene are added 140.5 parts of benzoyl-chlorid and the mixture is heated for a short time at boiling point. After cooling, the new base is extracted by means of hydrochloric acid, and the acid solution precipitated with ammonia. The precipitate is drawn off by suction and dissolved in 2000 parts of hot benzene. After the solution has cooled, the dibenzoyl-hydrocuprein crystallizes out in fine colorless needles which melt at 147° centigrade and are readily soluble in alcohol and chloroform, but difficultly soluble in petroleum-benzin and water.

*Example XI: Ethyl-hydrocuprein-ethyl-carbonate.*—340 parts of ethyl-hydrocuprein are dissolved in 3400 parts of benzene, mixed with 108.5 parts of ethyl ester of chloroformic acid and heated for a short time at boiling point. After cooling, the reaction mixture is extracted with dilute hydrochloric acid, and the base dissolved in the acid is precipitated by means of ammonia and absorbed with ether. The base is preferably, converted into its readily crystallizable salicylate by adding salicylic acid to the etheral solution of the base dried with calcium chlorid until the reaction becomes acid. On being left to stand (after preliminary concentration if required) the salicylate of ethyl-hydrocuprein-ethyl-carbonate crystallizes in colorless crystals, which melt at from 138° to 142° centigrade and are readily soluble in alcohol and benzene but are more difficultly soluble in ether and very difficultly soluble in petroleum-benzin. The free base forms a colorless powder which is readily soluble in alcohol and chloroform, but difficultly soluble in petroleum-benzin and water.

Having thus described the invention, what is claimed and desired to be secured by Letters-Patent is:—

1. The process of producing esters of hydrocinchona alkaloids which comprises acidulating the corresponding hydrocinchona alkaloids with acid chlorids.

2. The process of producing esters of hydroquinin which comprises acidulating hydroquinin with acid chlorids.

3. The process of producing aromatic esters of hydrocinchona alkaloids which comprises acidulating with aromatic acidulating agents the corresponding hydrocinchona alkaloids.

4. The process of producing aromatic esters of hydroquinin which comprises acidulating hydroquinin with aromatic acidulating agents.

5. The process of producing benzoyl esters of hydrocinchona alkaloids which comprises benzoylating the corresponding hydrocinchona alkaloids.

6. The process of producing benzoyl esters of hydroquinin which comprises benzoylating hydroquinin.

7. As new products the herein described aromatic esters of the hydrocinchona alkaloids, being colorless and tasteless bodies, which in general are more stable toward potassium permanganate than the corresponding cinchona alkaloid esters, and which are readily soluble in alcohol and chloroform but difficultly soluble in petroleum benzin and water.

8. As new products the herein described aromatic esters of hydroquinin, being colorless and tasteless bodies, which are in general more stable toward potassium permanganate than the corresponding quinin esters, and which are readily soluble in alcohol and chloroform but difficultly soluble in petroleum benzin and water.

9. As new products the benzoic acid esters of the hydrocinchona alkaloids, being colorless and tasteless bodies, which are in general more stable toward potassium permanganate than the corresponding cinchona alkaloid esters, and which are readily soluble in alcohol and chloroform but difficultly soluble in petroleum benzin and water.

10. As new products the benzoyl esters of the hydrocinchona alkaloids, being colorless and tasteless bodies, which are in general more stable toward potassium permanganate than the corresponding cinchona alkaloid esters, and which are readily soluble in alcohol and chloroform but difficultly soluble in petroleum benzin and water.

11. As a new product the benzoyl ester of hydroquinin, being a colorless and tasteless body, forming crystals melting at 102–107° C., readily soluble in alcohol and chloroform but difficultly soluble in petroleum benzin and water.

In testimony whereof I have signed my name to this specification in the presence of two subscribing witnesses.

HEINRICH THRON.

Witnesses:
    JEAN GRUND,
    CARL GRUND.